A. BELER.
TEMPERATURE REGULATOR.
APPLICATION FILED AUG. 29, 1908.
917,704.
Patented Apr. 6, 1909.
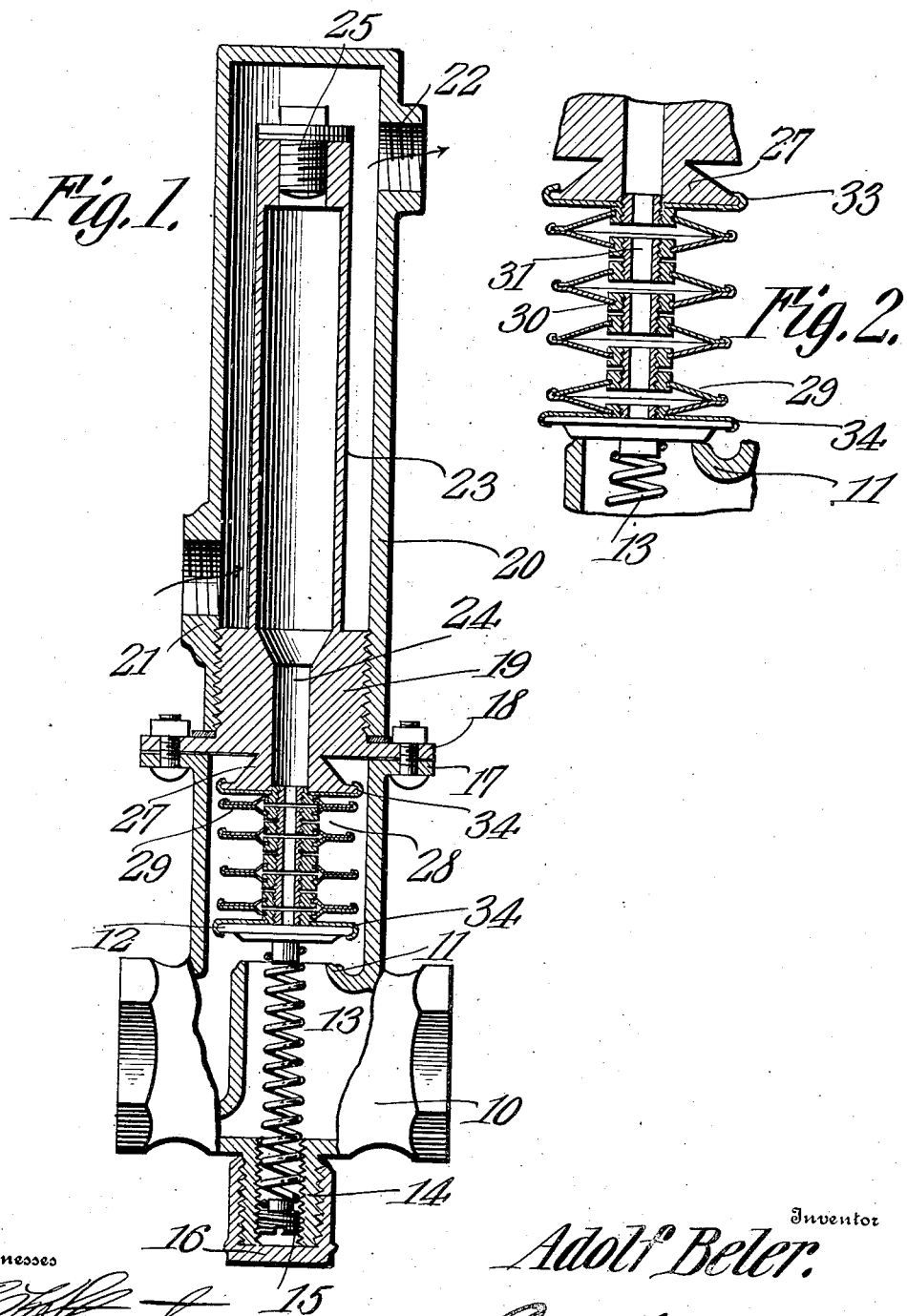

UNITED STATES PATENT OFFICE.

ADOLF BELER, OF PITTSBURG, PENNSYLVANIA, ASSIGNOR TO BELER WATER HEATER CO., OF PITTSBURG, PENNSYLVANIA.

TEMPERATURE-REGULATOR.

No. 917,704.   Specification of Letters Patent.   Patented April 6, 1909.

Application filed August 29, 1908. Serial No. 450,819.

*To all whom it may concern:*

Be it known that I, ADOLF BELER, a citizen of the United States, residing at Pittsburg, in the county of Allegheny and State of Pennsylvania, have invented a new and useful Temperature-Regulator, of which the following is a specification.

This invention relates to fluid pressure regulators and has for its principal object to provide a regulator of extremely sensitive nature in which the controlling valve is opened and closed by the operation of an expansible fluid exposed to varying temperatures.

A further object of the invention is to provide a thermostatically operating pressure regulator in which the valve is under the control of a confined body of expansible fluid.

A still further object of the invention is to provide a thermostatic element in the form of a container having an expansible portion and filled with a fluid that quickly responds to variations in temperature.

With these and other objects in view, as will more fully hereinafter appear, the invention consists in certain novel features of construction and arrangement of parts, hereinafter fully described, illustrated in the accompanying drawings, and particularly pointed out in the appended claim, it being understood that various changes in the form, proportions, size and minor details of the structure may be made without departing from the spirit or sacrificing any of the advantages of the invention.

In the accompanying drawings:—Figure 1 is a sectional elevation of a fluid pressure regulator constructed in accordance with the invention. Fig. 2 is a detail view of a portion of the expansion chamber in expanded position.

Similar numerals of reference are employed to indicate corresponding parts throughout the several figures of the drawings.

Coupled to the flow pipe of the fluid to be controlled is a valve casing 10 having a valve seat 11 that is arranged for the reception of a valve 12. This valve is normally held away from the seat by a helical compression spring 13, the outer end of which extends into an opening formed in a threaded boss 14 on the valve casing. The outer end of the spring bears against a block 15 that is screwed within the opening in order to permit adjustment of the stress of the spring, and fitting over the boss is a cap nut 16 to exclude dirt and prevent leakage. The valve casing is extended in cylindrical form to a bolting flange 17 to which is secured the flange 18 of an externally threaded block 19 on which is screwed the end of a cylindrical casing 20. The casing 20 is closed at the outer end and is provided with nipples 21 and 22 to which may be coupled the inlet and outlet pipes of a fluid circulating system of any type.

Secured to or formed integral with the block 19 is a tubular casing 23 which communicates with a central passage 24 formed in the block. The outer end of the casing is closed by a removable block 25, and said casing is filled with some fluid that is quickly responsive to variations in temperature, such for instance, as ether, alcohol or mercury.

At the inner end of the block 19 is a tapered boss 27 to which is connected an expansion chamber 28 that is formed of a series of connected disks 29, the inner ends of which are carried by collars 30 that are screwed onto short coupling sleeves 31 the endmost disks 33 and 34 of the expansion chamber being provided with flanges that are bent around the boss 27 and the valve 12 respectively. When the expansion chamber is contracted the disks 29 come close together as shown in Fig. 1, and when expanded they spread slightly as shown in Fig. 2, for the purpose of forcing the valve to its seat.

In operation, the controlling fluid enters the casing 20 at the nipple 21 and after circulating around the chamber 23 escapes at the nipple 22. The wall of the chamber 23 is very thin so that the temperature of the controlling fluid is quickly communicated to the expansible fluid in said chamber 24. If the temperature of this fluid is higher than normal it will expand and force the chamber 28 to expand so that the valve 12 will be forced against its seat or will be moved in the direction of its seat a distance corresponding to the degree of temperature beyond the normal so that the flow of the controlling fluid through the valve 10 will be diminished or altogether cut off. As the temperature of the controlling fluid decreases the expansible fluid will contract and the spring 13 will then force the valve farther away from its seat.

What is claimed is:—

In apparatus of the class described, a valve casing having a cylindrical extension terminating in a bolting flange and provided with an exteriorly threaded boss and a valve seat, said boss being provided with a central bore the interior walls of which are threaded, a valve arranged to close against the seat, an adjustable bearing block engaging the interior threads of the boss, a spring having one end thereof bearing against the valve-seat and its opposite end engaging a bearing block, a threaded block having a flange bolted to the flange of the valve casing and provided with a central opening, an expansible chamber connecting the valve to the block and communicating with the opening, a thin-walled chamber extending from the block and communicating with the opening therein, said chamber being filled with an expansible fluid, and a fluid circulating casing mounted on the threaded block and surrounding said thin-walled chamber.

In testimony that I claim the foregoing as my own, I have hereto affixed my signature in the presence of two witnesses.

ADOLF BELER.

Witnesses:
ROBT. G. MATTERN,
HARRY M. STEIN.